(12) United States Patent
Campbell et al.

(10) Patent No.: US 6,539,876 B1
(45) Date of Patent: Apr. 1, 2003

(54) GUIDE RAIL SWITCHES FOR STORAGE LIBRARIES

(75) Inventors: James P. Campbell, Mead, CO (US); Timothy C. Ostwald, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 10/034,301

(22) Filed: Dec. 28, 2001

(51) Int. Cl.[7] .............................................. E01B 25/26
(52) U.S. Cl. ................... 104/130.01; 104/101
(58) Field of Search ...................... 104/130.01, 130.03, 104/130.04, 101

(56) References Cited

U.S. PATENT DOCUMENTS

| | | | | |
|---|---|---|---|---|
| 1,286,042 A | * | 11/1918 | McClure et al. | 104/130.01 |
| 1,373,637 A | * | 4/1921 | Riblet | 104/101 |
| 2,535,541 A | * | 12/1950 | Le Fiell | 104/101 |
| 2,944,491 A | * | 7/1960 | Le Fiell | 104/130.01 |
| 3,313,243 A | * | 4/1967 | Lauber | 104/101 |
| 3,318,261 A | * | 5/1967 | Garcia et al. | 104/130.04 |
| 3,670,659 A | * | 6/1972 | Schurch | 104/101 |

* cited by examiner

*Primary Examiner*—S. Joseph Morano
*Assistant Examiner*—Lars A. Olson
(74) *Attorney, Agent, or Firm*—Carstens, Yee & Cahoon, L.L.P.

(57) ABSTRACT

A guide rail switch for a robotic track system is provided, the robotic track system comprising at least one horizontal guide rail, at least one vertical guide rail, and at least one robot that can move along the guide rails. The switch comprises a frame coupled to the horizontal guide rail and the vertical guide rail, and a moving joint coupled to the frame, wherein the moving joint can move between a first and second position. A first rail section is coupled to the moving joint, wherein the first track section connects to the horizontal guide rail when the moving joint is in the first position. A second rail section coupled to the moving joint, wherein the second track section connects to the vertical guide rail when the moving joint is in the second position. This switch allows the robot to move between the vertical and horizontal rail depending on which position the switch is in.

4 Claims, 8 Drawing Sheets

GUIDE RAIL SWITCHES FOR STORAGE LIBRARIES

BACKGROUND OF THE INVENTION

1. Field of the Invention

The present invention relates generally to media storage libraries and more specifically to a mechanism for switching between alternate guide rail paths for robots.

2. Background of the Invention

Typical library designs using more than one robotic accessor have contention problems. For example, when one accessor is moving toward a tape reader unit another accessor will want to move away from the unit, and their paths must meet somewhere. This effectively causes performance degradation and makes the control of the robots extremely complex.

Library performance is determined by robot availability during periods of high activity. Especially with single-robot systems, the mount time for a job is dependent on the dismount time. Multiple robot systems provide more accessories for higher availability, but the mechanical and software components of a typical library system are not designed to unlink the mount time from the dismount time.

For libraries using horizontal storage arrays, efficient mounting and dismounting of media cartridges, as well as avoidance of robot contention requires the ability of robots to smoothly move between horizontal levels and loop around the library.

Therefore, it would be desirable to have a system that allowed robots in a horizontal storage library to switch between horizontal and vertical guide tracks, without complex software or hardware requirements.

SUMMARY OF THE INVENTION

The present invention provides a guide rail switch for a robotic track system, the robotic track system comprising at least one horizontal guide rail, at least one vertical guide rail, and at least one robot that can move along the guide rails. The switch comprises a frame coupled to the horizontal guide rail and the vertical guide rail, and a moving joint coupled to the frame, wherein the moving joint can move between a first and second position. A first rail section is coupled to the moving joint, wherein the first track section connects to the horizontal guide rail when the moving joint is in the first position. A second rail section coupled to the moving joint, wherein the second track section connects to the vertical guide rail when the moving joint is in the second position. This switch allows the robot to move between the vertical and horizontal rail depending on which position the switch is in.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
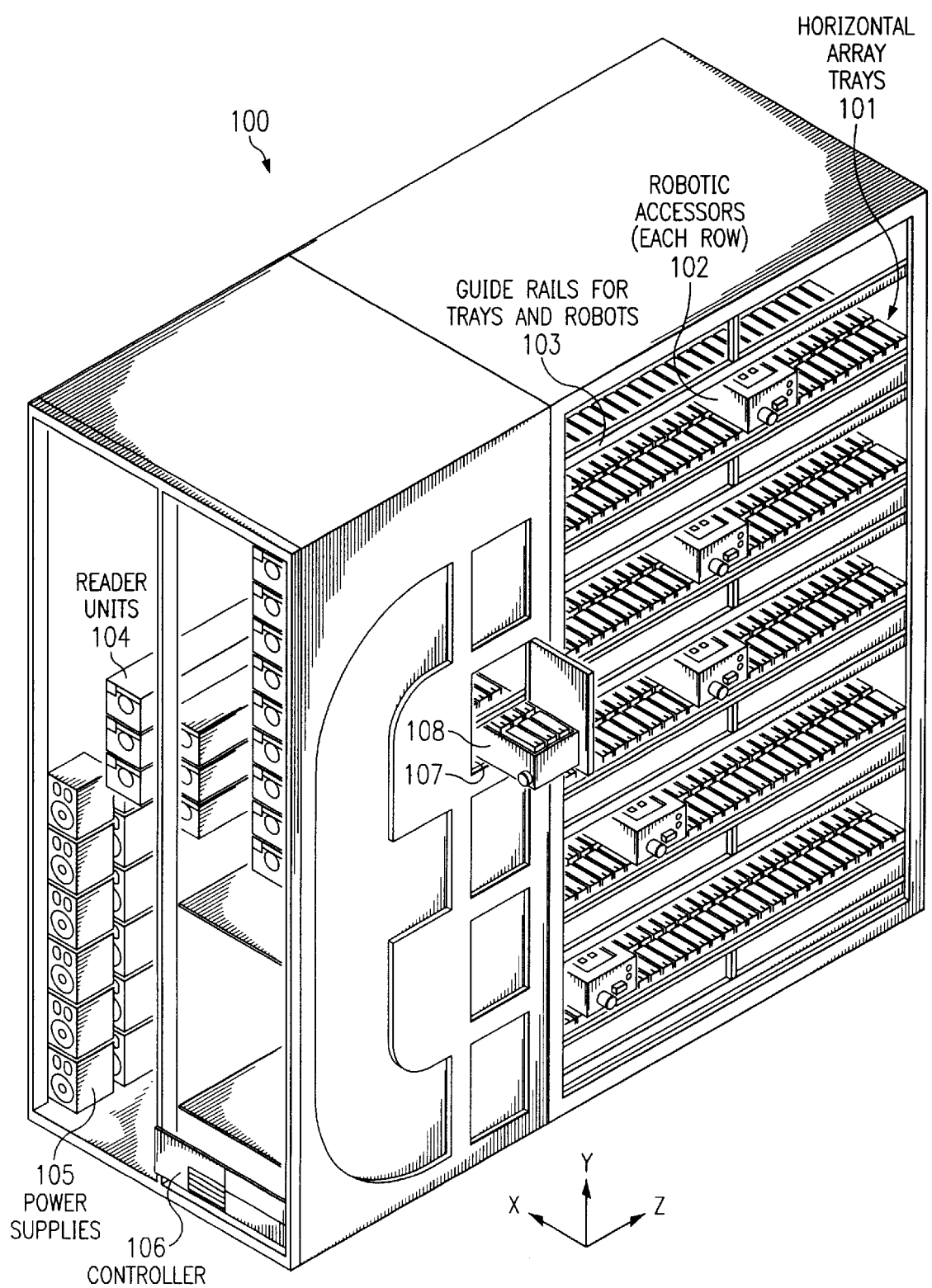
FIG. 1 depicts an isometric pictorial diagram illustrating a library unit with horizontal storage arrays in accordance with the present invention.

Referring to FIG. 1, an isometric pictorial diagram illustrating a library unit with horizontal storage arrays is depicted in accordance with the present invention. It should be pointed out that FIG. 1, as well as all of the figures discussed below, depicts the library system without side covers, so that the internal components may be viewed.

Library unit 100 represents the basic design from which larger horizontal library systems can be built. Media elements (i.e. cartridges) are stored in horizontal array trays, e.g., 101, which are arranged in multiple rows. The horizontal arrays are comprised of storage cells arranged horizontally in rows and columns. Media cartridges within the storage cells are retrieved and replaced vertically.

Robotic accessors, e.g., 102, utilized horizontal guide rails, e.g., 103, to move along the array trays 101 in order to access the media elements. The robots 102 use propulsion motors and drive wheels to move along the guide rails 103. The guide rails 103 may also be used to allow the horizontal array trays 101 to slide in and out of the enclosure of library unit 100. Alternatively, separate guide rails may be provided to facilitate removal of the storage cell trays 101.

Library unit 100 contains media reader units 104, power supply units 105, and a controller 106. FIG. 1 depicts an open cartridge access port (CAP) 107 and pass-through tray 108, which are included for each horizontal row in library system 100 and allow media cartridges to be passed between adjacent library units, as explained in detail below.

The typical prior art library is configured with vertical cartridge storage walls made up of storage cells arrayed in a vertical plane or curved wall. The storage cells in such a library may be removable to allow access into an enclosure. However, the media storage slots making up a storage wall are seldom deep enough to gain an advantage when removed; i.e. the removal of a wall does not create enough additional space for a human operator to fit through the narrow pathway.

The present invention of the horizontal array structure permits the storage density of a library to reach a new maximum limit, based on robot size, not human size. The horizontal array trays can be packed as closely together as robot height permits, without the need to leave room for a human operator to access components within the enclosure. An access isle can easily be created by removing some of the horizontal arrays, e.g., 101, to gain access (illustrated below).

Figure 2:
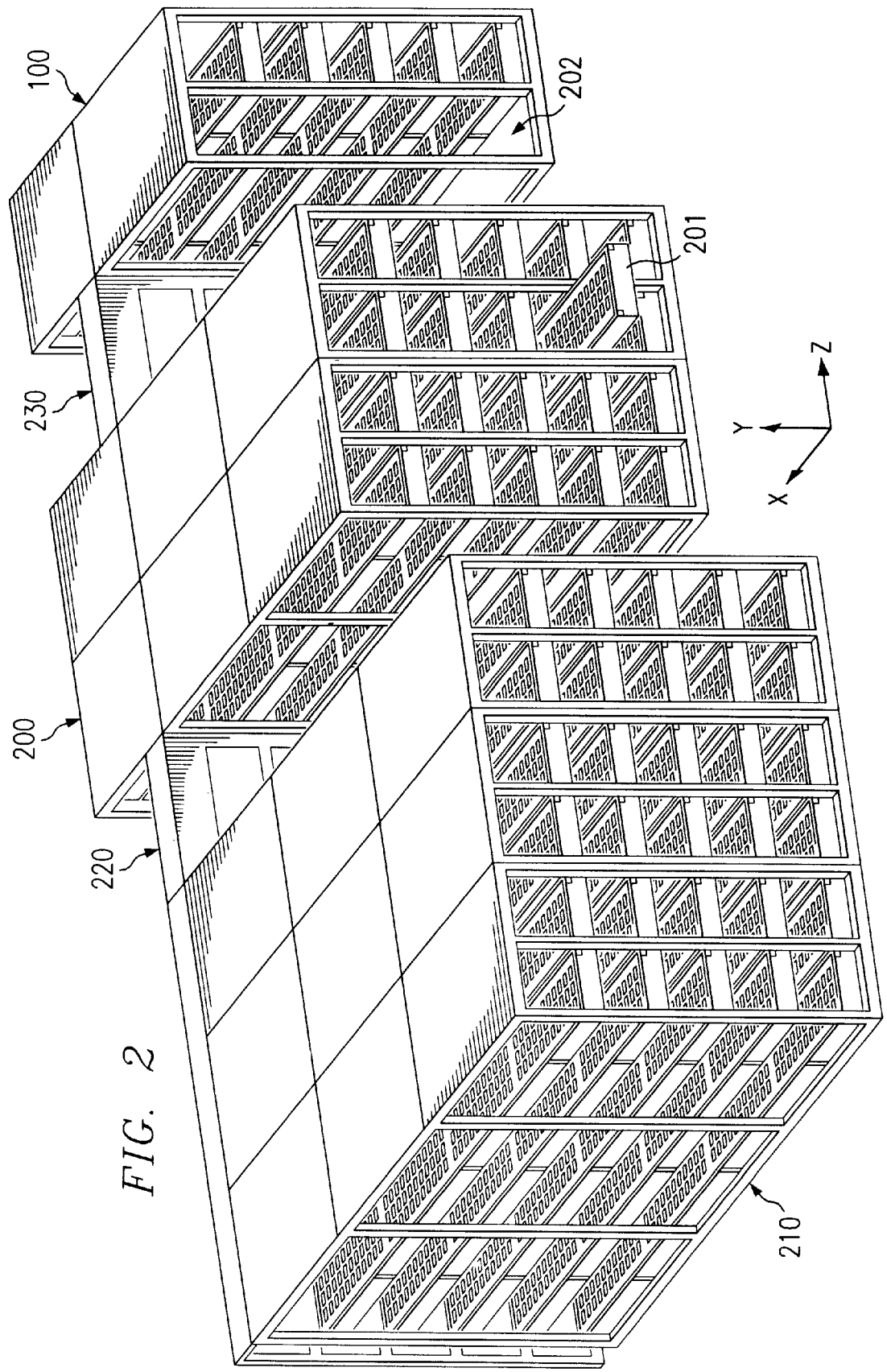
FIG. 2 depicts a front isometric view pictorial diagram illustrating the composite library system in accordance with the present invention.

Referring to FIG. 2, a front isometric view pictorial diagram illustrating the composite library system is depicted in accordance with the present invention. This composite library is comprised of library unit 100, depicted in FIG. 1, as well as two larger interconnected units 200 and 210. Library units 200 and 210 share the same basic horizontal layout as unit 100 but are larger.

The view depicted in FIG. 2 illustrates how human operators may access the storage elements and media readers within each of the library enclosures 100, 200, and 210 from the front side. The array tray support structure are designed with linear guide rails, e.g., guide rail 103 in FIG. 1, that allow an array tray to be removed from the library by simply sliding the tray outward (down the end of a guide rails) until the end of the rail is reached, thus allowing the tray to be completely removed from the library structure. Array tray 201 illustrates a tray that is partially withdrawn from library enclosure 200. Access space 202 illustrates how a service isle may be created when multiple array trays are completely removed from the library enclosure, as explained above. The horizontal configuration allows the design to take advantage of the storage array size to set the width of the pathway created when array packages are removed. For example, by creating a storage array tray of 16 cartridge slots, an isle width of 20 inches can be obtained between support structures for the array trays.

In addition to removing single trays, the array tray modules could be hooked together to form a group of trays, such that by pulling an endmost tray, all of the other trays connected to it would slide out to gain full access to all the trays. This process can be performed by an operator or possibly with automated electro-mechanical motors for large systems with many trays, e.g., enclosure 210.

FIG. 2 also depicts the housings for the pass-through mechanisms 220 and 230 that connect the three library enclosures 100, 200 and 210. The operation of these pass-through mechanisms 220 and 230 are discussed in more detail below.

Figure 3:
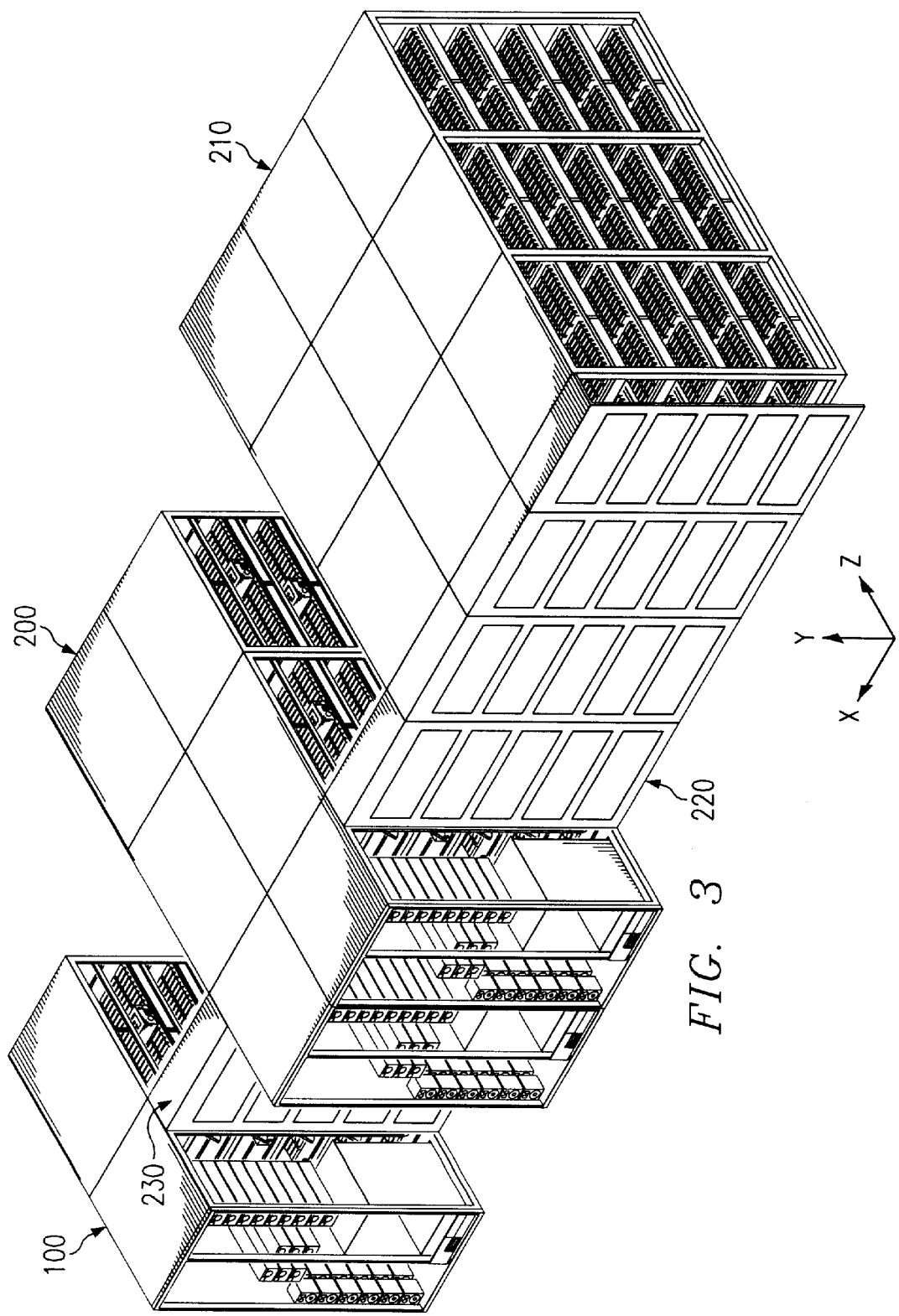
FIG. 3 depicts a rear isometric view pictorial diagram illustrating a composite library system in accordance with present invention.

Referring to FIG. 3, a rear isometric view pictorial diagram illustrating a composite library system is depicted in accordance with the present invention. As can be seen from this angle, library unit 210 does not contain its own media readers. Cross-enclosure pass-through mechanisms 220 and 230 are able to transfer media cartridges from enclosure 210 to the appropriate media readers in enclosures 100 and 200.

With prior art vertical wall libraries, adding storage walls requires the robot accessors to have a path intersecting at a common "lobby" in front of the media readers, wherein paths intersect in orthogonal directions to reach the common area. These vertical designs require extra guide rails that may have to intersect to get the robots into the shared space in front of a tape reader unit.

For horizontal storage, capacity is added without having to join robot spaces in a common "lobby" near the tape reader units. The horizontal configuration of the present invention uses "cross tracks" within the pass-through mechanisms 220 and 230 to move cartridges between expansion units to get the tapes in front of the appropriate media reader.

Figure 4:
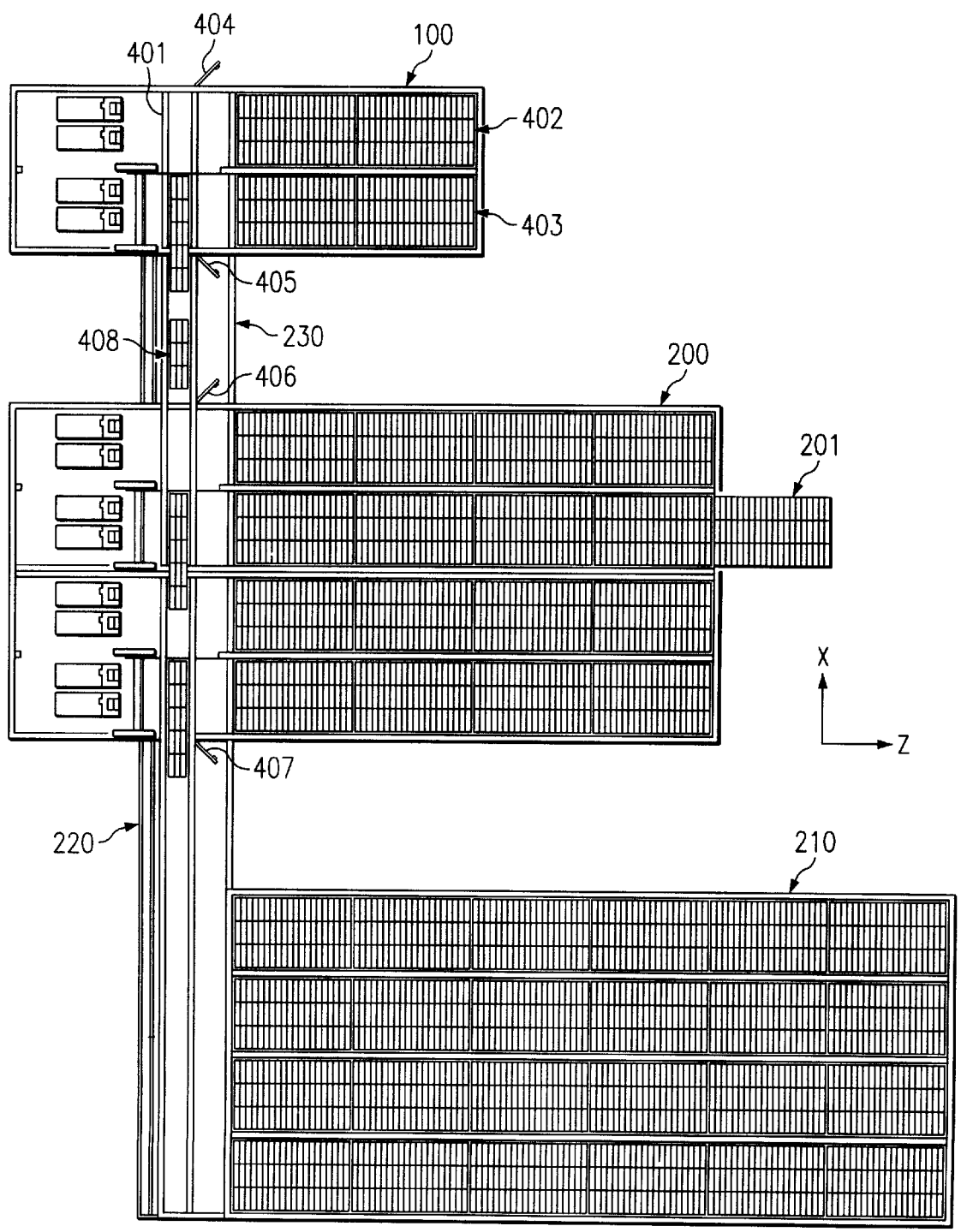
FIG. 4 depicts a top view pictorial diagram illustrating the composite library system in accordance with the present invention.

Referring to FIG. 4, a top view pictorial diagram illustrating the composite library system is depicted in accordance with the present invention. FIG. 4 more clearly illustrates the components of the pass-through mechanisms 220 and 230 and cross-track features.

The pass-through mechanisms 220 and 230 rely on a cross-cabinet (or across-the-cabinet) guide rail 401, which can move media cartridges (or robots themselves) against the grain of the normal robot flow. The cross-cabinet guide rail 401 runs through each horizontal row within the library enclosures 100, 200, and 210. The cross-cabinet guide rail 401 serves as a movement path 1) to get media in between adjacent banks of storage cells, 2) to provide an easy access method for cartridge entry into the library, and 3) to provide a method for movement of cartridges (or robots) between library enclosures.

For example, cross-cabinet guide rail 401 allows media cartridges to move between adjacent storage cell banks 402 and 403.

Cartridge access port (CAP) 404 allows easy access for adding or removing media cartridges from enclosure 100. Additional CAPs 405, 406 and 407 are provided on each side of enclosures 100 and 200 to allow motorized pass-through trays, e.g., 408, to carry cartridges between enclosures 100, 200, and 210. Through not pictured in FIG. 4, it should be pointed out that CAPs are placed on all horizontal levels within enclosures 100 and 200.

Another embodiment comprises the movement of the actual robotic accessors between sections of the enclosure, using track joints and sub-rails. This approach is very similar to the pass-through tray method described above, except that robots are used to carry media cartridges between enclosure and reader, rather than pass-through trays.

The use of horizontal array structure permits the library to grow easily in two dimensions. Expanding a library can be accomplished by growing in the z direction (along the robot guide track) and/or growing sideways in the x direction (side-by-side accumulation of more storage tray rows). The library is limited in the Y direction by the room ceiling height.

Figure 5:
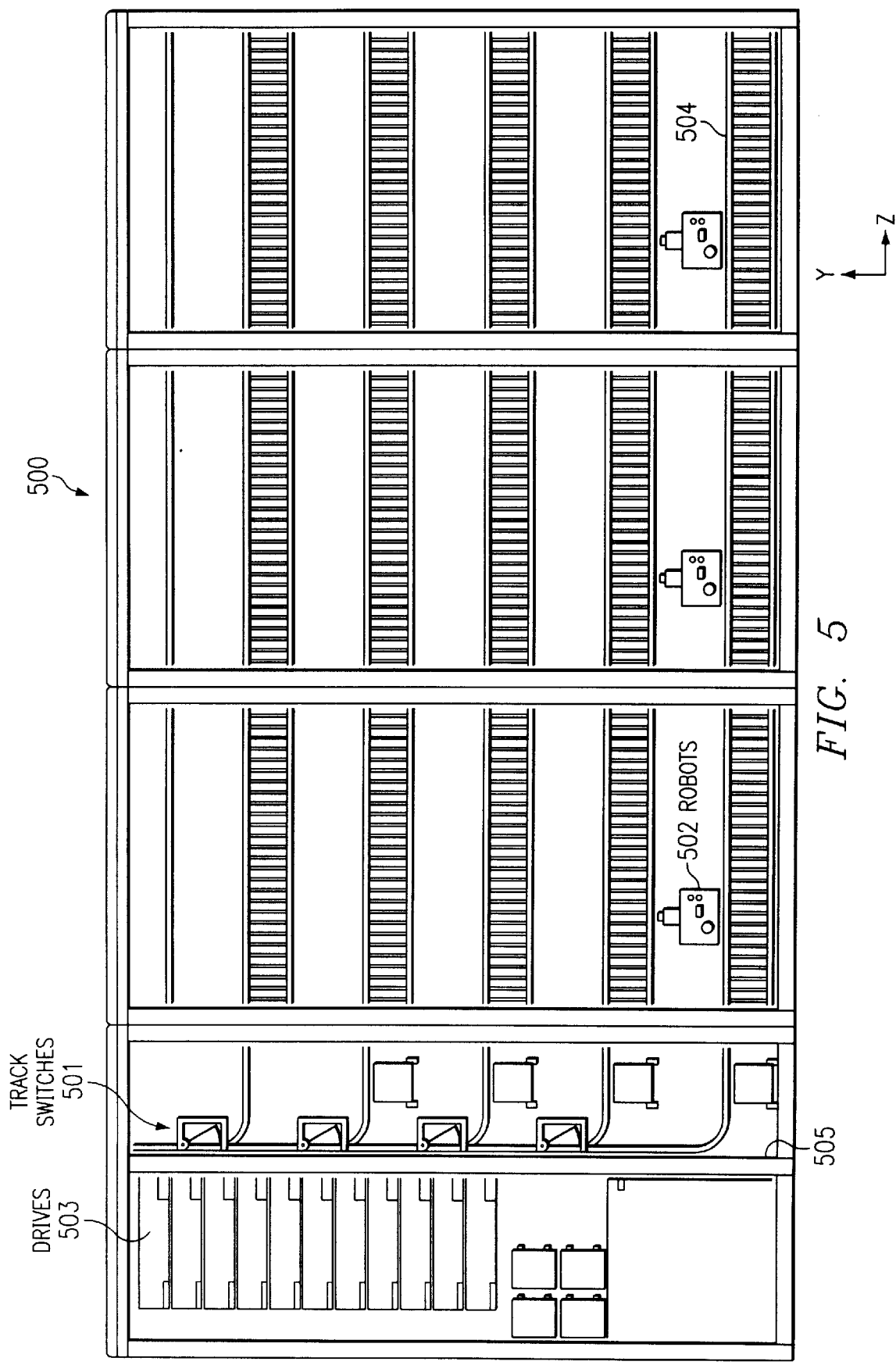
FIG. 5 depicts a cross-section, side view pictorial diagram illustrating a horizontal library unit in accordance with the present invention.

Referring to FIG. 5, a cross-section, side view pictorial diagram illustrating a horizontal library unit is depicted in accordance with the present invention. FIG. 5 illustrates how Robots, e.g., 502, are translated between different horizontal levels within the library. Guide track switches 501 at each level allow the robots 502 to switch between horizontal guide rails, e.g., 504, and a vertical guide rail 505. This enables robots 502 to move between different horizontal levels, as well as move between different media readers/drive 503, which are stacked vertically along vertical guide rail 505.

Figure 6:
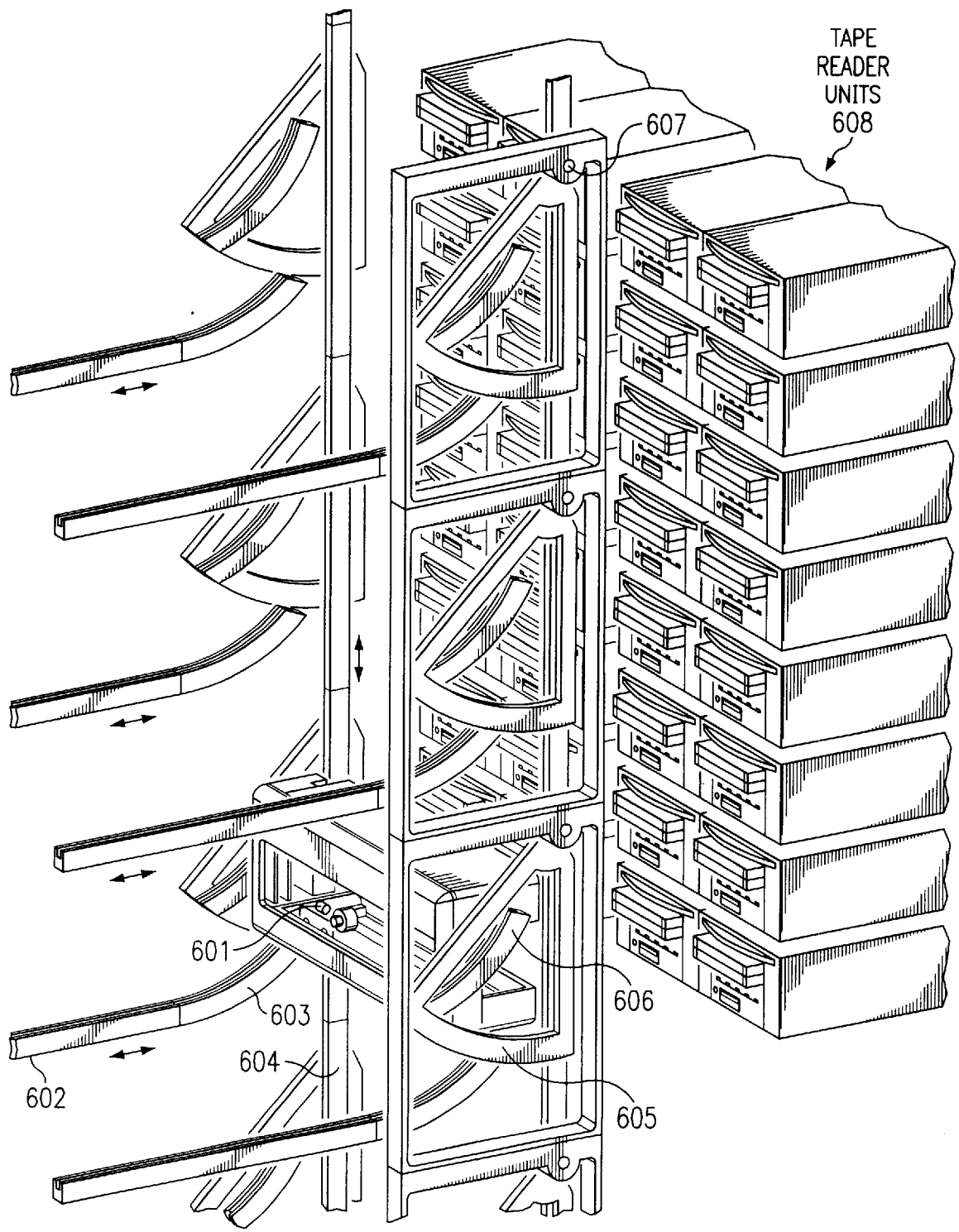
FIG. 6 depicts a pictorial diagram illustrating guide track switching mechanisms for each horizontal level in accordance with the present invention.

Referring to FIG. 6, a pictorial diagram illustrating guide track switching mechanisms for each horizontal level is depicted in accordance with the present invention. The embodiment of the track switch depicted in FIG. 6 uses a "Y" junction 605 wherein a motor or other actuator controls the position of a moving guide rail 606 around a pivot point 607. This allows the moving guide rail 606 to be aligned with a fixed curve track 603, thus allowing robot 601 to make the transition from the vertical rail 604 to the horizontal rail 602. The Y joint is an application of the "turntable joint" (round house) used in railroad examples. The mechanical working of the Y joint are described in more detail below.

Figure 7:
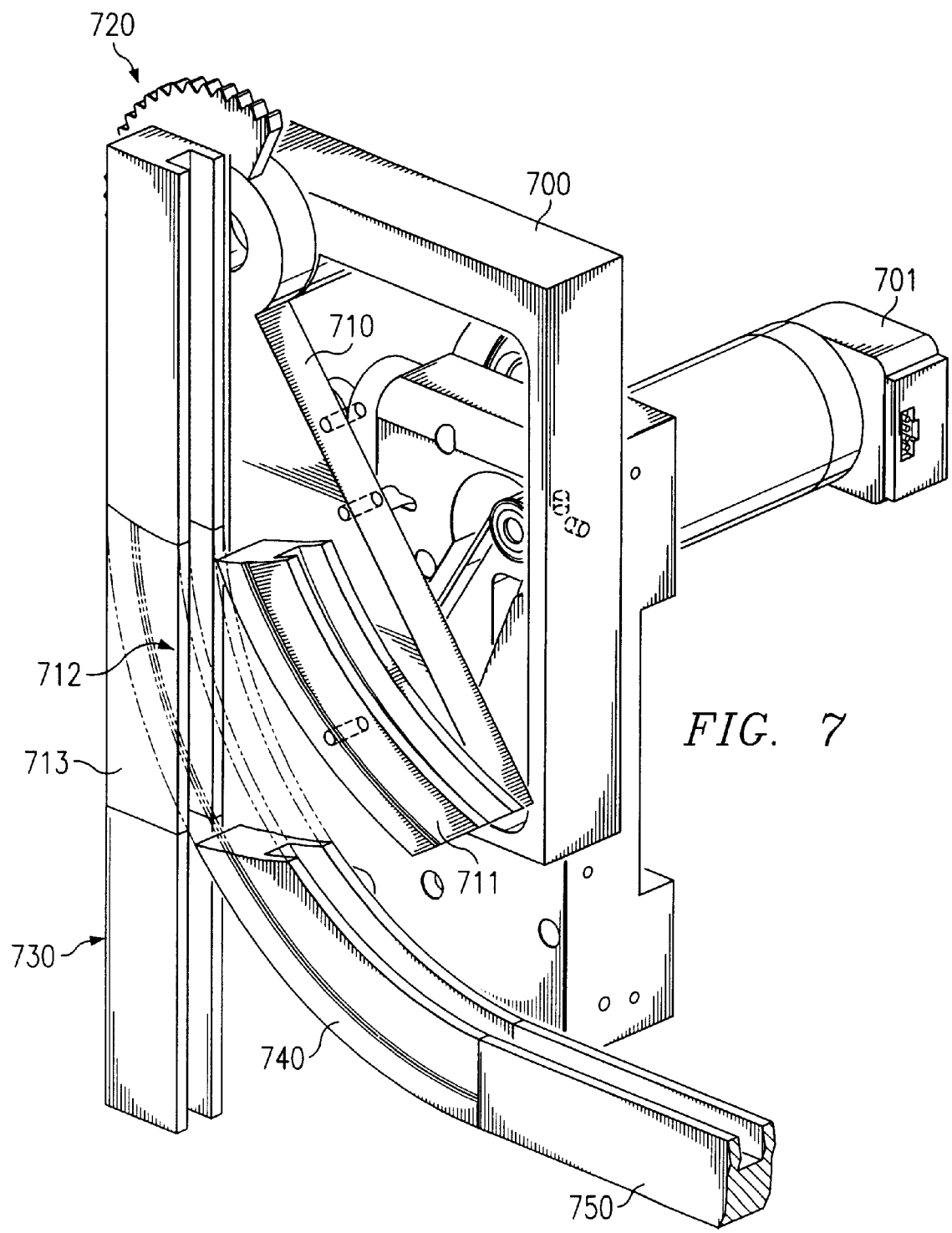
FIG. 7 depicts a pictorial diagram illustrating a Y joint in a track switch in accordance with the present invention.

Referring to FIG. 7, a pictorial diagram illustrating a Y joint in a track switch is depicted in accordance with the present invention. A partial robot structure 700 and robot propulsion motor 701 are illustrated attached to the guide rails. The Y joint 710 is moved by actuator gear 720 (motor not shown). The Y joint 710 has two partial rail sections: a straight section 713 and a curved section 711/712. The curved section of rail is shown in two different positions: disengaged 711, and engaged 712.

When the Y joint 710 is brought forward by the actuator gear 720, the curved rail section 711 is disengaged, and the straight section 713 is engaged with the vertical track 730. In this forward position, the robot 700 will continue to move along the vertical track 730.

When the Y joint 710 is brought backward by the actuator gear 720, the straight section 713 is disengaged, and the curved section 712 is engaged with the fixed curved rail 740. In this position, the robot 700 can move onto the horizontal guide rail 750.

Another embodiment of the track switch uses a "passive" Y joint, wherein a spring-loaded moving track section would let a robot pass through it to get on a fixed rail but not come back the other way. The moving section would be fixable-to cause the robot to go onto only one of the rail sections of the Y track. This design effectively creates one-way traffic for the robots, because the robots can always be guided forward through the track switch, without returning over the same Y joint in the opposite direction.

Figure 8:
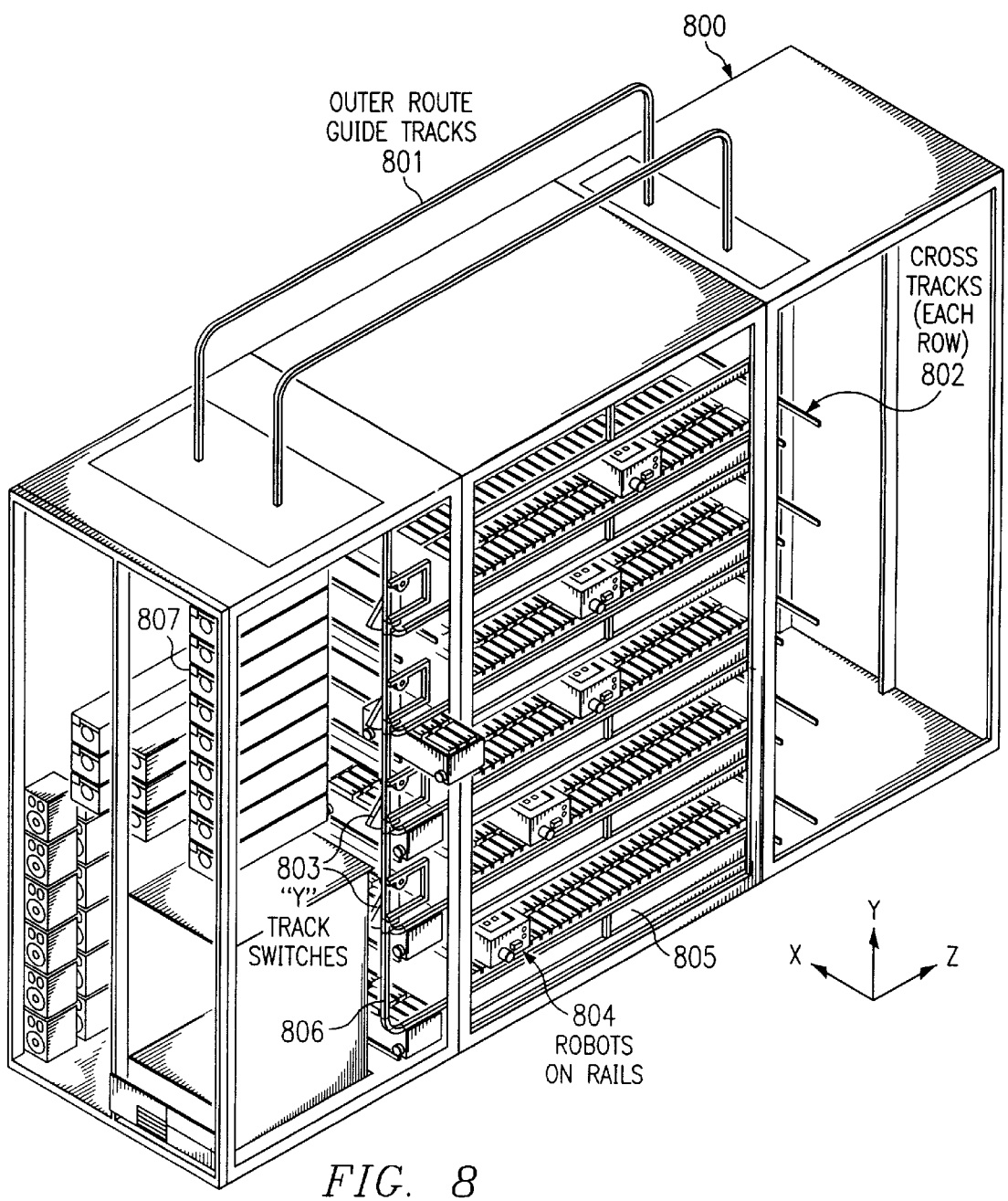
FIG. 8 depicts an isometric view pictorial diagram illustrating an outer route guide rail mechanism in accordance with the present invention.

Referring to FIG. 8, an isometric view pictorial diagram illustrating an outer route guide rail mechanism is depicted in accordance with the present invention. The horizontal library design allows for the addition of guide rail structures 801 that allow any of the robots 804 to move in a loop back to the far end of the structure 800. For example, robot 804 can use track switch 803 to move from horizontal array 805 to the vertical track 806. This allows robot 804 to move upward and load (or remove) a media cartridge into one of the media readers 807. The robot 804 can then loop over the structure 800 by means of the outer route rails 801 and come down on the opposite side. A vertical rail and rack switches, similar to rail 806 and switch 803, are placed on the opposite end of library 800, but are not visible due to the angle of the view in FIG. 8. These other track switches allow robot 804 to move onto any of the horizontal levels in library enclosure 800. Thus, the outer route rails 801 allow the robot to move in a clockwise direction. This provides a return path for continuous loading of data cartridges toward the tape reader units.

To avoid robot contention, the control software can be used to ensure that the robots only move in the clockwise loop described above. If the control software for the system is structured to force the movements of all robots to be in the same direction (i.e. clockwise), the robots can always loop up and around to get to any desired position, thereby achieving a state of operation where no contention occurs between robots on the same track. As explained above, passive, spring-loaded Y joints may also be used to force robots to move in a single direction along the guide rails, thus eliminating the need for additional control software to reduce contention.

In addition, opposite directions of movement might be assigned to alternate horizontal levels, thereby allowing robots to use a shorter return loop, rather than having to loop all the way over the library and down the other side.

Also shown in FIG. 8 are cross-cabinet tracks 802, described above. Movement on the cross-cabinet track may also be controlled so that robots only move in one horizontal direction at either end of the library. For example, the robots might be forced to move in a horizontal clockwise path along the horizontal arrays and cross-cabinet tracks, thereby eliminating contention between robots moving between adjacent banks of storage arrays.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A guide rail switch mechanism for a robotic track system, the robotic track system comprising a horizontal guide rail, a first vertical guide rail, and a second vertical guide rail that is collinear with the first vertical guide rail and separated from the first vertical guide rail by a space, and at least one robot that can move along the guide rails, the switch mechanism comprising:

a straight rail connector section coupled to a switch;

a curved rail connector section coupled to said switch;

wherein the horizontal guide rail, first vertical guide rail, second vertical guide rail, straight rail connector section, and curved rail connector section are all in a common plane;

wherein the switch moves within said common plane between a first position and a second position;

wherein when the switch is in the first position, the straight rail connector section connects the first vertical guide rail and second vertical guide rail; and wherein when the switch is in the second position, the curved rail connector section connects the first vertical guide rail and horizontal guide rail.

2. The switch mechanism according to claim 1, wherein the switch is moved by an actuating motor.

3. The switch mechanism according to claim 1, wherein the switch is spring loaded to allow robots to move over the straight connector section and curved rail connector section in only one direction.

4. The switch mechanism according to claim 1, wherein the robotic track system is part of a data storage library.

* * * * *